United States Patent

Fenton

[15] 3,700,729
[45] Oct. 24, 1972

[54] PREPARATION OF AROMATIC ACIDS

[72] Inventor: Donald M. Fenton, Anaheim, Calif.

[73] Assignee: Union Oil Company of California, Los Angeles, Calif.

[22] Filed: Dec. 6, 1965

[21] Appl. No.: 512,012

[52] U.S. Cl. ............260/515 R, 252/416, 260/479 R, 260/515 A, 260/520, 260/521 R, 260/544 A, 260/546
[51] Int. Cl. ....C07c 63/00, C07c 63/06, C07c 63/10
[58] Field of Search....260/515, 544 A, 468 CB, 260, 260/544

[56] References Cited

UNITED STATES PATENTS

| | | | |
|---|---|---|---|
| 3,452,090 | 6/1969 | Mador | 260/544 |
| 2,710,879 | 6/1955 | Snyder | 260/514 |
| 3,346,625 | 10/1967 | Fenton et al. | 260/497 A |

FOREIGN PATENTS OR APPLICATIONS

| | | | |
|---|---|---|---|
| 987,516 | 3/1965 | Great Britain | 260/544 |
| 145,569 | 5/1962 | U.S.S.R. | |

OTHER PUBLICATIONS

Tsuji et al.: Tetrahedron Letters, No. 16 (1963), pp. 1061–1064

*Primary Examiner*—James A. Patten
*Attorney*—Milton W. Lee, Richard C. Hartman, Lannas S. Henderson, Jack M. Miller, Robert E. Strauss, Dean Sandford and William S. Brown

[57] ABSTRACT

An aromatic acid is prepared by reacting in the liquid phase an aromatic with carbon monoxide in the presence of a catalyst selected from the group consisting of palladium and ferric chloride and bromides and mixtures thereof and an anhydrous organic liquid inert to the above reactants and catalyst at a temperature between about 100° C. and 300° C. and at a pressure to maintain liquid phase, and then hydrolyzing the resultant carbonylated compound to said aromatic acid.

17 Claims, No Drawings

PREPARATION OF AROMATIC ACIDS

This invention relates to the preparation of aromatic carboxylic acids and in particular relates to the preparation of such acids by the carbonylation of aromatic substrates.

This invention comprises the carbonylation of aromatic substrates by contacting the aromatic with carbon monoxide in the presence of a reaction medium containing a halide salt of a Group VIII metal in its highest valency, i.e., most oxidized state, under substantially anhydrous conditions, preferably in the presence of a suitable organic anhydride to insure that the reaction medium is maintained substantially anhydrous. The reaction can be performed under relatively mild conditions of temperatures from about 100° to about 250° C. and pressures from about 1 to about 200 atmospheres, sufficient to maintain liquid phase conditions. The product of this reaction is a mixture of the corresponding acid, acid halide and anhydride.

The reaction results in the stoichiometric reduction of the Group VIII metal to a lower oxidation state. The reduced metals or their salts are separated from the reactants and products and can be regenerated to their higher oxidation state by contact with oxygen. The reaction is performed under liquid phase conditions and when the reactant aromatic is a liquid at the reaction conditions this reactant can comprise the liquid phase. If desired, however, suitable amounts of an inert solvent can be included in the reaction zone to maintain the liquid phase.

The aromatic substrate to be carbonylated can be any mono- or polycyclic aromatic and can contain various ring substituents which are inert to the reactants such as alkyl, cycloalkyl, oxy and halo substituents. Examples of suitable compounds which can be carbonylated in accordance with my invention are benzene, naphthalene and anthracene compounds having ring substituents which do not interfere with the reaction, i.e., substituents that are inert to the reactants and solvent and stable under the reaction conditions. Examples of suitable compounds are the following: benzene and benzene derivatives; benzene, toluene, cumene, o,p,m-xylene, ethylbenzene, amylbenzene, p-octyltoluene, o-hexadecyltoluene, pseudocumene, durene, as well as alkylates of alkene oligomers such as propylene tetramers with benzene, etc. The aromatic substrate can also be naphthalene and naphthalene derivatives, e.g., naphthalene, alphamethylnaphthalene, 2,6-dimethylnaphthalene, beta-propylnaphthalene, etc. Anthracene and alkyl anthracene derivatives can also be reacted, e.g., anthracene, methylanthracenes, dimethylanthracenes, etc. The aromatic substrate can also contain halo substituents, i.e., chloride, fluoride, iodide or bromide, e.g., chlorobenzene, dichlorobenzene, alphachloronaphthalene, chloroanthracene, bromobenzene, bromopseudocumene, 6-fluoro-2-methylnaphthalene, etc. Oxy aromatics which are reactive in the process include the phenols, naphthols, etc. and in particular the esters thereof with aliphatic carboxylic acids such as phenyl acetate, phenyl propionate, naphthyl acetate, phenyl pentonate, etc.

The reaction is performed under liquid phase conditions in the presence of an organic solvent which has a solvency for the catalyst and which is a liquid and, preferably, inert under the reaction conditions. Various organic liquids can be employed for this purpose such as carboxylic acids, sulfones, ketones and ethers. Carboxylic acids such as the lower molecular weight aliphatic acids are preferred and, even when other solvents are used, it is preferred to maintain at least 10 percent of the solvent as an aliphatic carboxylic acid.

Illustrative of the preferred solvents are acetic, propionic, butyric, pentanoic, hexanoic, heptanoic, octanoic, pivalic, etc. Of these the aliphatic carboxylic acids having about two to about six carbons are preferred, and especially preferred is acetic acid.

Other organic solvents that can be employed include the alkyl and aryl sulfones such as dimethylsulfone, propylethylsulfone, diisopropylsulfone, decylmethylsulfone, butylamylsulfone, diisooctylsulfone, diphenylsulfone, methylbenzylsulfone, etc.

Various alkyl and aryl ketones can also be employed as the reaction solvent, e.g., acetone, methylethyl ketone, diethyl ketone, diisopropyl ketone, ethyl n-butyl ketone, methyl n-amyl ketone, cyclohexanone, diisobutyl ketone, etc.

Ethers can also be employed as the reaction solvent, e.g., diisopropyl ether, di-n-butyl ether, ethylene glycol diisobutyl ether, ethylene glycol di-butyl ether, diisoamyl ether, dichloroethyl ether, ethylene glycol diisoamyl ether, diethylene glycol diethyl ether, diethylene glycol dimethyl ether, ethylene glycol dibutyl ether, triethylene glycol diethyl ether, diethylene glycol di-n-hexyl ether, tetraethylene glycol dimethyl ether, tetraethylene glycol dibutyl ether, etc.

The reaction can be performed in the presence of a suitable dehydrating agent which can be added to the reactants upon initiation of the reaction to insure that the reaction is maintained under substantially anhydrous conditions. The dehydrating agent can be added to the liquid phase in the reaction zone in an amount from about 0.1 to about 5 weight percent of the liquid phase, preferably from about 1 to about 2 weight percent. Various organic dehydrating agents which are inert to the oxidative carbonylation and which react with water to form under the oxidation conditions a product which does not inhibit the production of the desired product can be used. Typical of these are anhydrides and halides of aromatic and saturated carboxylic acids. For ease of handling, such an agent preferably has from two to about 25 carbons. Examples of suitable compounds are acid anhydrides of alkane and benzene carboxylic acids, e.g., acetic, propionic, butyric, valeric, caproic, caprylic, capric anhydrides, etc.; phthalic anhydride, benzoic anhydride, etc.; acyl halides, preferably chlorides of alkanoic and benzene carboxylic acids such as acetyl chloride, propanyl bromide, valeryl fluoride, caproyl chloride, benzoyl chloride, toluyl chloride, etc.

The reaction medium should contain a Group VIII metal bromide or chloride. The metal can be of the iron, palladium or platinum metal subgroups although when using a metal from the iron subgroup it is preferred to employ also a slight amount of a metal from the noble metal subgroups. Examples of suitable iron group metal salts are: ferric chloride, ferric bromide, cobaltic chloride, cobaltic bromide, nickel chloride, nickel bromide. The noble metal can be of the palladium subgroup or the platinum subgroup, i.e., the chloride or bromide salts of palladium, rhodium or ruthenium or platinum, osmium or iridium. While all of these metals are active for the reaction, I prefer the chloride or bromide salts of palladium because of its demonstrated greater activity, particularly in combination with ferric bromide or chloride.

The Group VIII metal salt can be used at any concentration in the reaction medium from about 0.1 to 30 weight percent; preferably from about 5 to 20 weight percent. At the maximum concentration the reaction medium is a slurry since the metal salts are present in excess of their solubility. During the reaction, these metal salts will nevertheless participate since the soluble metal cations in their highest valency become reduced during the reaction, permitting some of the remaining salts to dissolve. In this manner, the necessity to recycle vast quantities of the solvent between oxidation and regeneration stages is avoided and only sufficient solvent need be used to maintain a transportable slurry.

When an iron group metal is used, it is preferred to employ a noble metal salt as a cocatalyst. The noble metal can be used in minor amounts, e.g., the amount of iron group metal can be present in 10 to about 500 times the weight amount of the noble metal; preferably a weight ratio between 25 and 250 can be used.

The carbon monoxide is introduced into contact with the reactants at a sufficient rate to insure that the desired carbonylation occurs. Relative ratios of the carbon monoxide based on the aromatic can be from 1:10 to 100:1 mols per mol of aromatic. Preferably mol ratios from about 1:1 to about 20:1, and most preferably from 2:1 to 5:1 are used.

The reaction can be performed under relatively mild conditions, e.g., temperatures from about 100° to about 300° C.; preferably from about 150° to about 200° C. are employed. The reaction pressure employed is sufficient to maintain a liquid phase and preferably superatmospheric pressures are used to accelerate the reaction rate. Accordingly, pressures from about atmospheric to about 200 atmospheres or more, preferably from about 50 to about 100 atmospheres are used. Reaction periods of several seconds to several hours can be used; completion of the reaction can be observed by disappearance of the reactants, e.g., reduction of pressure by CO consumption or by formation of the reduced metal, e.g., palladium metal or ferrous chloride.

During the oxidation a portion of the liquid reaction medium can be continuously withdrawn and the desired aromatic acid halide separated therefrom by conventional means, e.g., crystallization and filtration, distillation or extraction. The reaction medium containing the catalyst salts can then be regenerated and recycled for further contacting to the reaction zone. The acid halide can also be hydrolyzed to the acid by the addition of water to the reaction medium and the resultant acid thereafter recovered as the reaction product.

The crude reaction product can be oxidized prior to recovery of the aromatic acid halide and this regeneration converts the halide product to the aromatic acid. To the extent that side reactions occur and water is formed in excess of that stoichiometrically necessary for the acid formation, water removal by vaporization or by the addition of a dehydrating agent, typically a fatty acid anhydride is desirable before recycling of the reaction medium to the carbonylation zone. This technique therefore produces the aromatic acid as the major product.

The aromatic acid can be recovered from the regenerated solution by any suitable method, i.e., crystallization and filtration, distillation, extraction, etc.

The regeneration of the reduced salts can be achieved by any suitable oxidation step using oxygen or mixtures of oxygen with inert gases such as nitrogen, carbon dioxide, e.g., air. Promotors such as ultraviolet light, ozone, nitrogen oxides, etc., can be used but are not necessary. Pressures from atmospheric to superatmospheric pressures to about 200 atmospheres or more can be used and temperatures from about 75° to about 300° C. can be used to facilitate the oxidation. Preferably, temperatures from 100° to 200° C. with pressures from 20 to about 100 atmospheres are used. Since the oxidation of the reduced solution forms water, the catalyst solution is dried before reuse. Suitable techniques such as distillation with or without a water azeotroping agent such as benzene, toluene, etc., can be used to remove the water. An excess of any of the aforementioned dehydrating agents can also be added to remove the water.

The reaction medium can also be preferably buffered with an alkali metal salt such as a halide or carboxylate of lower molecular weight fatty acids having from one to about six carbons.

Examples of suitable salts which can be included in an amount up to about 10 weight percent; preferably up to about 5 weight percent; are sodium chloride, lithium bromide, potassium chloride, cesium bromide, sodium acetate, lithium propionate, potassium valerate, etc.

The following examples will illustrate the practice of my invention and serve to illustrate the results obtainable thereby.

EXAMPLE 1

A 300 milliliter tantalum-lined autoclave was charged with 20 milliliters toluene, 50 milliliters acetic acid, 30 milliliters acetic anhydride, 20 grams ferric chloride and 1 gram of palladium chloride. The autoclave was closed and pressured to 48 atmospheres with carbon monoxide. The mixture was rocked and heated to 125° C. and maintained at that temperature for 2 hours, then heated to 175° C. and maintained at that temperature for an additional 2 hours. Upon completion of the reaction period the autoclave was cooled and opened. The contents were added to 10 milliliters of water and the acetic acid solvent was distilled from the liquid phase by evaporation on a steam bath. The residue was extracted with aqueous sodium hydroxide and the extract was filtered and then acidified with hydrochloric acid to precipitate 4 grams para toluic acid therefrom.

EXAMPLE 2

Using the procedure and equipment of Example 1, a series of experiments was made under varied conditions and with varied reactants and metal salts. The following Table 1 summarizes the results of varied conditions with toluene as the reactant:

TABLE 1

| Experiment | Pressure | Temperature | time | iron group | noble metal | solvent | product |
|---|---|---|---|---|---|---|---|
| 1 | 34 atmospheres | 175°C. | 4 hr. | 20 g FeCl₃ | ½ g PdCl₂ | 75 ml acetic acid 20 ml acetic anhydride | 2 g p-toluic acid |
| 2 | 68 atmospheres | 125°C. | 6 hr. | 20 g FeCl₃ | ½ g PdCl₂ | 80 ml acetic acid 10 ml acetic anhydride | 1 g p-toluic acid |
| 3 | 68 atmospheres | 125°C. 2 hr. 175°C. 2 hr. | | 30 g FeBr₃ | ½ g PdCl₂ | 75 ml acetic acid 15 ml acetic anhydride | 2 g p-toluic acid |
| 4 | 68 atmospheres | 125°C. 2 hr. 175°C. 2 hr. | | 20 g FeCl₃ | none | 50 ml acetic acid 10 ml acetic anhydride | 0.1 g p-toluic acid |

EXAMPLE 3

The procedure and equipment of Example 1 was used in several experiments with benzene as the reactant and varied conditions. The results are summarized in Table 2:

TABLE 2

| Experiment | Pressure | Temperature | time | iron group | noble metal | solvent | product |
|---|---|---|---|---|---|---|---|
| 5 | 68 atmospheres | 125°C. 2 hr. 175°C. 2 hr. | | 20 g FeCl₃ | none | 40 ml acetic acid 30 ml acetic anhydride | 1 g benzoic acid |
| 6 | 48 atmospheres | 150°C. 1 hr. 230°C. 1 hr. | | None | 3 g PdCl₂ | None | 0.6 g benzoic acid |

EXAMPLE 4

The experiments were repeated on varied aromatics and the following results were obtained with an initial CO pressure of 68 atmospheres.

TABLE 3

| Experiment | reactant | temperature | time | iron group | noble metal | solvent | Product |
|---|---|---|---|---|---|---|---|
| 7 | 20 g naphthalene | 125°C. 2 hr. 175°C. 2 hr. | | 20 g FeCl₃ | 1 g PdCl₂ | 100 ml acetic acid 30 ml acetic anhydride | 7 g naphthoic acid |
| 8 | 20 ml iodobenzene | 125°C. 2 hr. 175°C. 2 hr. | | 20 g FeCl₃ | ½ g PdCl₂ | 75 ml acetic acid 25 ml acetic anhydride | 2 g iodobenzoic acid |
| 9 | 20 ml chlorobenzene | 125°C. 2 hr. 175°C. 2 hr. | | 20 g FeCl₃ | 1/2 g PdCl₂ | 80 ml acetic acid 10 acetic anhydride | 1 g chlorobenzoic acid |
| 10 | 20 ml phenyl acetate | 125°C. 2 hr. 175°C. 2 hr. | | 20 g FeCl₃ | 1/2 g PdCl₂ | 75 ml acetic acid 20 ml acetic anhydride | 2 g carboxyphenyl acetate |

EXAMPLE 5

The following illustrates an oxidation method to restore a reduced catalyst solution. Into a 250 milliliter glass flask is introduced 100 milliliters of acetic acid containing 20 grams ferrous chloride, 1 gram finely divided palladium and 10 grams lithium chloride. The flask contents are heated to 100° C. and maintained at that temperature for 8 hours while air is bubbled into the liquid. After 8 hours substantially all the palladium metal is dissolved and the ferrous chloride is oxidized to ferric chloride.

The preceding examples are intended only to illustrate a mode of practice of the invention and are not to be construed as unduly limiting thereof. Instead it is intended that the invention be defined by the method steps, reactants and reagents, and their obvious equivalents set forth in the following claims:

I claim:

1. The reaction of an aromatic compound to an aromatic acid having one more carbon than said aromatic compound that comprises contacting, in a reaction zone, an aromatic compound having from six to about 25 carbons and being selected from the class of benzene, naphthalene and anthracene and their derivatives containing inert alkyl, halo and oxy substituents with carbon monoxide in the presence of substantially anhydrous organic liquid reaction medium which contains a catalyst and which is inert to said reactants and to the catalyst, said catalyst being present in an amount from 0.1 to about 30 weight percent of the reaction medium and being selected from the group consisting of palladous and ferric chlorides and bromides and mixtures thereof at a temperature from about 100° to about 300° C. and a pressure from 1 to about 200 atmospheres sufficient to maintain a liquid phase, maintaining said contacting until said catalyst is reduced to a lower valency and said aromatic compound is oxidatively carbonylated and thereafter hydrolyzing the oxidatively carbonylated aromatic compound to said aromatic acid.

2. The reaction of claim 1 wherein said catalyst is ferric chloride.

3. The reaction of claim 1 wherein said catalyst is palladous chloride.

4. The reaction of claim 1 wherein said catalyst is a mixture of ferric and palladous chloride.

5. The reaction of claim 1 wherein said reaction medium also contains from 0.1 to about 10 weight percent of a soluble alkali metal salt selected from the class of the chlorides, bromides and carboxylates of from one to six carbons containing fatty acids.

6. The reaction of claim 1 wherein said reaction medium also contains from 0.1 to about 5 weight percent of an organic dehydrating agent selected from the class consisting of the halides and anhydrides of aromatic and saturated carboxylic acids having from two to about 25 carbons.

7. The reaction of claim 1 wherein said reaction medium is separated from said oxidatively carbonylated aromatic compound and contacted with oxygen at a temperature from about 75° to about 200° C. to oxidize the lower valency state of said catalyst to said higher valency and then water formed by said oxidation is vaporized therefrom and said reaction medium is returned to said reaction zone.

8. The reaction of claim 1 including the step of contacting said reaction medium containing said oxidatively carbonylated aromatic compound with oxygen at a temperature from 75° to about 200° C. to oxidize the metal of said catalyst from its lower valency state to said higher valency state and hydrolyze said oxidatively carbonylated aromatic compound to an aromatic carboxylic acid and thereafter separating said aromatic carboxylic acid from said reaction medium.

9. The reaction of claim 1 wherein said aromatic compound has a benzene ring.

10. The reaction of claim 1 wherein said aromatic compound has a naphthalene ring.

11. The reaction of claim 1 wherein said aromatic compound is toluene.

12. The reaction of claim 11 wherein said catalyst is ferric chloride.

13. The reaction of claim 11 wherein the said catalyst is palladous chloride.

14. The reaction of claim 11 wherein the catalyst is a mixture of both ferric and palladous chloride.

15. The reaction of an aromatic compound having from six to about 25 carbon atoms selected from the class of benzene, naphthalene, anthracene and derivatives thereof with inert alkyl, cycloalkyl, oxy or halo substituents which comprises contacting said aromatic compound with carbon monoxide at a temperature of about 100° to 300° C. and at a pressure of about 1 to 200 atmospheres sufficient to maintain a liquid phase in the presence of a catalyst of palladous and ferric chlorides, bromides or mixtures thereof, to reduce said catalyst to a lower valency and to oxidatively carbonylate said aromatic compound and thereafter hydrolyzing the oxidatively carbonylated aromatic compound to an aromatic acid having one more carbon atom than said aromatic compound.

16. The reaction defined in claim 15 wherein said aromatic compound is selected from the class consisting of benzene, naphthalene and anthracene and their alkyl derivatives.

17. The method of preparing an aromatic acid halide which comprises contacting reactants consisting of an aromatic hydrocarbon selected from the group consisting of benzene, naphthalene and anthracene and their derivatives containing inert alkyl substitutents, carbon monoxide, and a halide of palladium at about 100° C. to 300° C. and a pressure from atmospheric to about 200 atmospheres sufficient to maintain a liquid phase.

* * * * *